United States Patent
Parker et al.

(10) Patent No.: US 10,627,507 B1
(45) Date of Patent: Apr. 21, 2020

(54) MULTIBEAM TRANSMITTER SYSTEM AND METHOD

(71) Applicants: Alan Dale Parker, Rancho Palos Verdes, CA (US); Jeffrey M. Yang, Signal Hill, CA (US)

(72) Inventors: Alan Dale Parker, Rancho Palos Verdes, CA (US); Jeffrey M. Yang, Signal Hill, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 337 days.

(21) Appl. No.: 15/624,499

(22) Filed: Jun. 15, 2017

(51) Int. Cl.
| | |
|---|---|
| G01S 13/931 | (2020.01) |
| H01Q 3/38 | (2006.01) |
| G08G 1/16 | (2006.01) |
| H01Q 3/40 | (2006.01) |
| G01S 13/02 | (2006.01) |
| G01S 7/02 | (2006.01) |

(52) U.S. Cl.
CPC ............ *G01S 13/931* (2013.01); *G08G 1/166* (2013.01); *H01Q 3/38* (2013.01); *H01Q 3/40* (2013.01); *G01S 7/024* (2013.01); *G01S 2013/0254* (2013.01); *G01S 2013/9318* (2020.01); *G01S 2013/9321* (2013.01); *G01S 2013/93185* (2020.01)

(58) Field of Classification Search
CPC ........... G01S 13/931; G01S 2013/9321; G01S 2013/9342; G01S 2013/9346; G01S 7/024; G01S 2013/0254; H01Q 3/40; H01Q 3/38; G08G 1/166

USPC .......................................................... 342/70
See application file for complete search history.

(56) References Cited

U.S. PATENT DOCUMENTS

| | | | |
|---|---|---|---|
| 4,886,069 A * | 12/1989 | O'Donnell | G01S 7/52046 600/457 |
| 5,008,678 A | 4/1991 | Herman | |
| 5,105,814 A * | 4/1992 | Drukarev | G01S 7/5209 600/441 |
| 5,613,039 A * | 3/1997 | Wang | G01J 3/453 706/24 |
| 5,623,928 A * | 4/1997 | Wright | G01S 7/52023 600/447 |
| 7,493,144 B2 | 2/2009 | Natarajan et al. | |

(Continued)

OTHER PUBLICATIONS

Office Action for U.S. Appl. No. 15/624,529 dated Oct. 10, 2019.

(Continued)

*Primary Examiner* — Frank J McGue
(74) *Attorney, Agent, or Firm* — Tarolli, Sundheim, Covell & Tummino LLP (57) ABSTRACT

A system includes a controller that includes a processor and a memory. The processor executes computer-executable instructions stored in the memory to operate the controller. The instructions cause the controller to determine at least two beam patterns for separate transmit beams that operate within the field of regard to be scanned by a Radio Detection and Ranging (RADAR) beam generator. The instructions also cause the controller to generate beam pattern commands to the RADAR beam generator to generate the beam patterns. The beam pattern commands specify a pointing direction for each of the separate transmit beams that operate within each portion of the field of regard.

19 Claims, 9 Drawing Sheets

(56) References Cited

U.S. PATENT DOCUMENTS

| | | | |
|---|---|---|---|
| 7,907,100 B2 | 3/2011 | Mortazawi et al. | |
| 8,289,203 B2 | 10/2012 | Culkin et al. | |
| 8,755,454 B2 * | 6/2014 | Sorrells | H04B 1/04 375/295 |
| 2007/0290930 A1 * | 12/2007 | Krishnaswamy | H01Q 3/26 343/700 MS |
| 2015/0175162 A1 * | 6/2015 | Nakadori | G01S 7/41 701/96 |
| 2016/0365631 A1 * | 12/2016 | Huang | H04B 7/0413 |

OTHER PUBLICATIONS

Parker, et al.: "*Multibeam Receiver System and Method*"—corresponding application being filed simultaneously herewith.

\* cited by examiner

MULTIBEAM TRANSMITTER SYSTEM AND METHOD

TECHNICAL FIELD

This disclosure relates to vehicle assist systems, and more particularly to multi-beam signal transmitters to facilitate data collection capabilities for a vehicle.

BACKGROUND

Many modern vehicles include radar scanning systems to assist the vehicle in such applications as automated emergency breaking (AEB) to stop the vehicle when objects are detected in a given vehicle's path. Traditional non-scanning radar transmitters illuminate the entire system field of regard (e.g., area where objects are to be detected) where associated receivers then detect backscatter from objects in the field of regard. Since the entire field of regard is illuminated, the transmitted energy is spread across the entire field of regard. A scanning phased array with a narrower beam illuminating a narrow field of view (e.g., angular cone) within the field of regard will have the same transmitted energy concentrated in a smaller beam, resulting in higher energy density and higher levels of return.

In order to cover the entire system field of regard, the narrower beam produced by a phased array beam forming network must be electrically scanned across the system field of regard. The phased array transmit beam illuminates each region for a brief period of time, then repositions to a new position and illuminates this second position, continuing until the entire system field of regard has been illuminated. The array transmit beam then cycles back to the starting position and repeats. Typical operation is to scan successive adjacent regions at a fixed scan rate, starting on one edge of the instantaneous field of view, moving the beam such that the edge of the beam slightly overlaps the previous field of view, and so on until the entire system field of regard has been illuminated. Adaptive scanning techniques may have the beam interrogate areas with known objects more extensively.

In a scan time example, assuming a frame rate of 20 frames per second (FPS), each field of regard should be sequentially illuminated within 50 msec. With azimuth only scan, with field of regard of 60 degrees, and field of view at 6 deg, the dwell time is about 5 msec at each beam position in the field of regard. The minimum dwell time at each beam position is governed by system accuracy requirements. Wider fields of regard reduce the dwell time at each position. As dwell time decreases, the amount of data collected at each field of view position within the field of regard decreases, which can decrease the accuracy of a system. Larger fields of view allow for longer dwell times and increased data collection, but transmitted power is spread over a larger beam area, which may reduce sensitivity of the system.

SUMMARY

This disclosure relates to multi-beam signal transmitters to facilitate data collection capabilities for a vehicle. In one aspect, a system includes a controller that includes a processor and a memory. The processor executes computer-executable instructions stored in the memory to operate the controller. The instructions cause the controller to determine at least two beam patterns for separate transmit beams that operate within a field of regard to be scanned by a Radio Detection and Ranging (RADAR) beam generator. The instructions also cause the controller to generate beam pattern commands to the RADAR beam generator to generate the beam patterns. The beam pattern commands specify a pointing direction for each of the separate transmit beams that operate within each portion of the field of regard.

In another aspect, a system includes a multi-beam generator for a vehicle that concurrently transmits at least two transmit beams over at least two different scanning regions of a field of regard in response to a beam command. Each of the at least two transmit beams operates at least one of a different radar detection frequency or across a different electromagnetic plane to mitigate interference between the transmit beams. A controller for the vehicle generates the beam command to the multi-beam generator to cause each of the at least two transmit beams to be directed across the at least two scanning regions of the field of regard. The at least two transmit beams reflect from objects within proximity of the vehicle.

In yet another aspect, a method includes generating at least two transmit beams over at least two different scanning regions of a field of regard for a vehicle in response to a beam command. The method includes receiving object data from the field of regard based on reflections received from the transmit beams. The method includes processing the object data to determine an object's proximity to the vehicle. The method includes initiating a vehicle corrective action for the vehicle if the object's proximity to the vehicle is determined within a predetermined proximity threshold.

DETAILED DESCRIPTION

This disclosure relates to a multi-beam transmitter system and method that can be employed to provide object scanning and detection for a vehicle where vehicles can include land, sea, or aircraft vehicles, for example. This can include detecting the distance between automobiles for vehicle safety systems (automated emergency breaking), for example. A first Radio Detection and Ranging (RADAR) beam operates in a sub-portion of allocated scanning bandwidth, and a second beam operates in a different sub-portion of the allocated bandwidth to facilitate increased scanning and dwell times that can capture more data than single beam systems. This allocation of bandwidth can be extended to an N-th transmit beam that operates in yet a different sub-portion of the allocated bandwidth. The respective beams are independently steerable and can scan in the same or different directions across a scan field of regard to detect the object. Each beam can utilize the antenna aperture and antenna elements to form the beam, thus each beam can have the same beam width. A variation of this method is to use subsets of an N×M array to form each beam.

In one example aspect, there are at least two transmit beams. Each beam can operate at different frequencies in one aspect to provide diversity between beams in order to mitigate interference between beams. For example, the first beam can operate between 76 and 76.5 GHz, and a second beam operates between 76.5 and 77 GHz where each beam can utilize a frequency modulated continuous wave (FMCW) chirp modulation of 500 MHz or less. Other types of beam-forming diversity can be provided between beams to mitigate potential overlap between the respective beams. In addition to frequency diversity, these beam-forming techniques can include polarization diversity (e.g., each beam directed on a different electromagnetic plane), spatial diversity (e.g., each beam directed at different areas within the field of regard), and/or waveform diversity (e.g., each beam generated via different phased weighting commands) to allow each beam to operate while not impacting the other beam(s).

Various beam scanning patterns can be utilized. For instance, a first beam scans half of the system field of regard (e.g., left hand side of scanning field), and a second beam scans the other half of the system field of regard. This allows each beam to dwell twice as long at any single position as a single beam phased array antenna operating over the same system field of regard. In one variant, the two beams can be controlled in a symmetric mirror image manner and in another variant, the two beams operate asymmetrically. In another aspect, the first beam scans the entire system field of regard, and the second beam independently interrogates and dwells at locations where objects have been detected. In yet another aspect, the first beam scans and illuminates to support the adaptive cruise control (ACC) mode for the radar, and the second beam concurrently scans and illuminates to support automated emergency breaking (AEB) mode. A single polarized transmit array that uses frequency separation to avoid interference can be employed to provide scanning whereas dual polarization can be employed to double the number of beams that operate within the same frequency band in another aspect.

Figure 1:
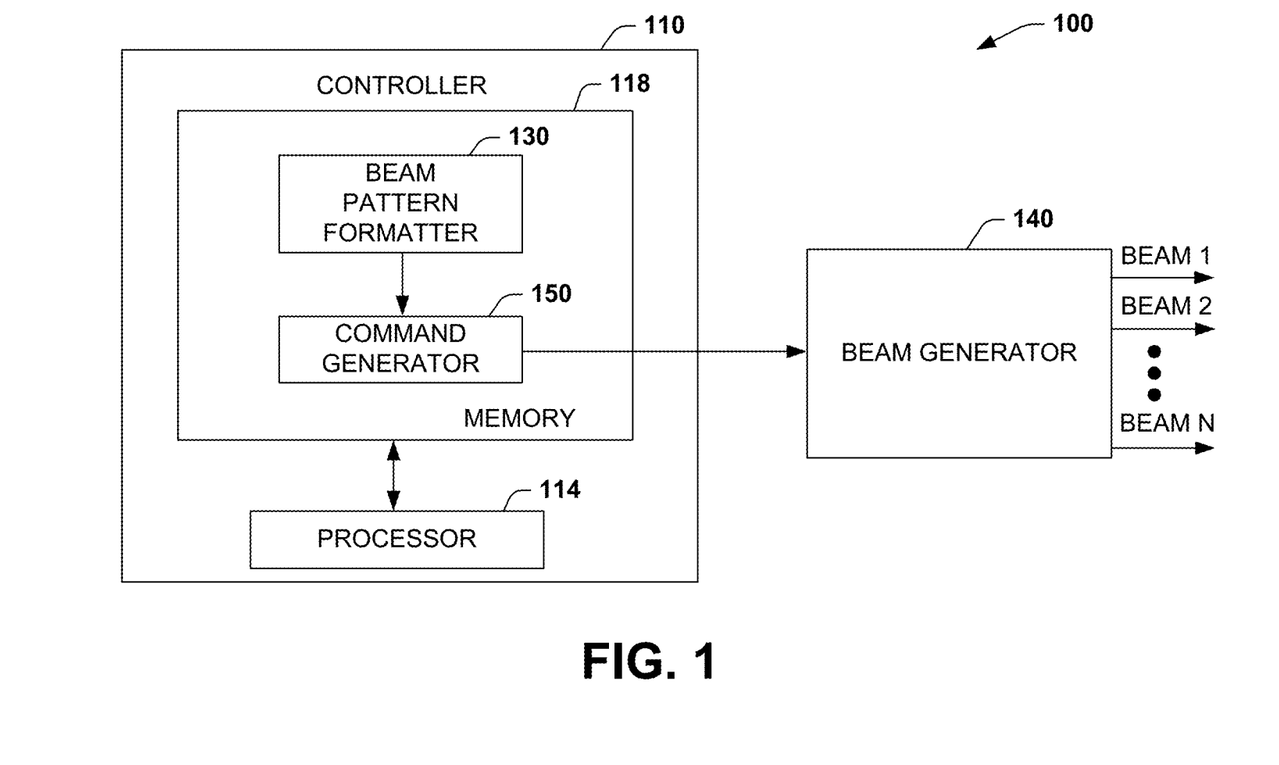
FIG. 1 illustrates an example of a multi-beam transmitter system to facilitate object detection for a vehicle.

FIG. 1 illustrates an example of a multi-beam transmitter system 100 to facilitate object detection for a vehicle. The system 100 includes a controller 110 having a processor 114 and a memory 118. As used herein, the term controller includes substantially any type of analog and/or digital circuit that is capable of executing instructions and having the ability to control one or more vehicle functions such as accelerating, slowing, stopping, breaking, steering, and so forth. The processor 114 executes computer-executable instructions stored in the memory 118 to operate the controller 110. The instructions in the controller 110 can include a beam pattern formatter 130 to determine at least two beam patterns for separate transmit beams that operate in at least two different portions of a field of regard to be scanned by a Radio Detection and Ranging (RADAR) beam generator 140. As used herein, the term field of regard refers to the area over which the beams can be scanned, shown as Beam 1 though Beam N, from the beam generator 140, where N is a positive integer. The term field of view refers to the sub-region in the field of regard that is illuminated by a beam at any given instant. As used herein, the term transmit beam refers to the RADAR signal generated from the various antenna systems described herein to detect an object.

The beam pattern formatter 130 can receive input from the controller 110 based on prospective conditions for a vehicle and select differing beam patterns based on the conditions (e.g., beams selected from a database or memory). For example, in heavy traffic, short range multi-beam patterns may be selected and on open highway, a combination of short and long range patterns may be selected. In one example, each of the respective patterns selected by the beam pattern formatter 130 can be selected to operate over a different portion of the field of regard encountered by a vehicle. In another example, beam patterns can be generated where one field radiates according to one polarization pattern (e.g., electric field polarization) and another field operates in a different polarization (e.g., magnetic field polarization).

After a beam pattern has been selected by the beam pattern formatter 130, a command generator 150 executed in the memory 118 generates beam pattern commands to the RADAR beam generator 140 to generate the beam patterns. The beam pattern commands specify a pointing direction for each of the separate transmit beams that operate within each portion of the field of view. As used herein, the term direction refers to the direction of the Beams 1-N with respect to their projection from the front of a vehicle. The direction includes an elevation specifying an upward or downward path from the front of the vehicle from or toward the ground, respectively. The direction also specifies an azimuth with refers to the leftward or rightward path of the transmit beams with respect to the front of the vehicle.

As will be illustrated and described below with respect to FIG. 2, the system 100 can also include a transmitter and at least one antenna (e.g., in the beam generator 140) to generate the beam patterns where the transmitter receives the beam pattern commands from the command generator 150 and provides excitation to the antenna (or antennas) in response to the beam commands to generate the beam patterns specified by the beam pattern formatter 130. In one example, the antenna can include at least one phased antenna array to generate the beam patterns. In another example, antennas that include mechanical scanning/steering elements (rotating mirrors or antenna elements) can be employed to generate and steer the beam patterns described herein.

The phased antenna array can utilize separate antenna arrays to generate the separate beams in response to the beam commands in one example. In another example, a single antenna array having antenna sub-arrays within the single antenna array can be employed to generate the separate beams in response to the beam commands. In yet another example, a single antenna array receives progressive phase weight commands as the beam commands that are applied to each element of the single antenna array to generate the separate beams. The progressive phase weight commands can be applied to each element of the single antenna array to provide a beam forming network (BFN) to form a plane wave at a face of the antenna aperture of the single antenna array to cause a selected beam of the separate beams to radiate in a desired direction. A parallel BFN is formed to generate a subsequent beam utilizing a different set of progressive weight commands that are summed at each element of the single antenna array. Antenna arrays are shown and described below with respect to FIG. 3.

At least one receiver (see e.g., FIG. 2) can be employed to receive reflected RADAR signals from objects in the field of regard. Output from the receiver can be directed to a vehicle corrective action processor in the controller 110 to affect vehicle control based on detected activity within the field of regard. If detected objects are detected by the receiver within a field scanned by the transmit beams, the controller can initiate a subsequent beam interrogation (or interrogations) within the field of the detected objects to improve accuracy of calculations of position and velocity of the objects or to facilitate control actions (if necessary) when objects are detected. The separate transmit beams can scan in the same direction in the field of regard in one example or scan in opposite directions in the field of regard based on the beam commands in another example. One beam of the separate transmit beams can be generated for a close range field of regard with respect to a vehicle and another of the separate transmit beams can be generated for a far range field of regard that extends a farther scanning distance than the close range field of view based on the beam commands.

The separate transmit beams can be generated at different frequencies based on the beam commands to mitigate interference between the transmit beams. Also, the separate transmit beams can be generated at different electromagnetic planes that include an electrical field plane and a magnetic field plane which is traverse to the electrical field plane to mitigate interference between the transmit beams. A combination of frequency and electromagnetic plane wave generation can be concurrently applied to generate the separate transmit beams. Also, the phased array transmitter described herein may also operate in an overlapping beam mode to increase system sensitivity by steering the two or more beams so that their respective fields of view substantially overlap within the field of regard (e.g., each of the separate transmit beams are pointed to a similar field of view within the field of regard to increase the sensitivity of the system within the similar field of view). Example beam patterns as described herein are illustrated and described with respect to FIGS. 4 through 9 below.

Figure 2:
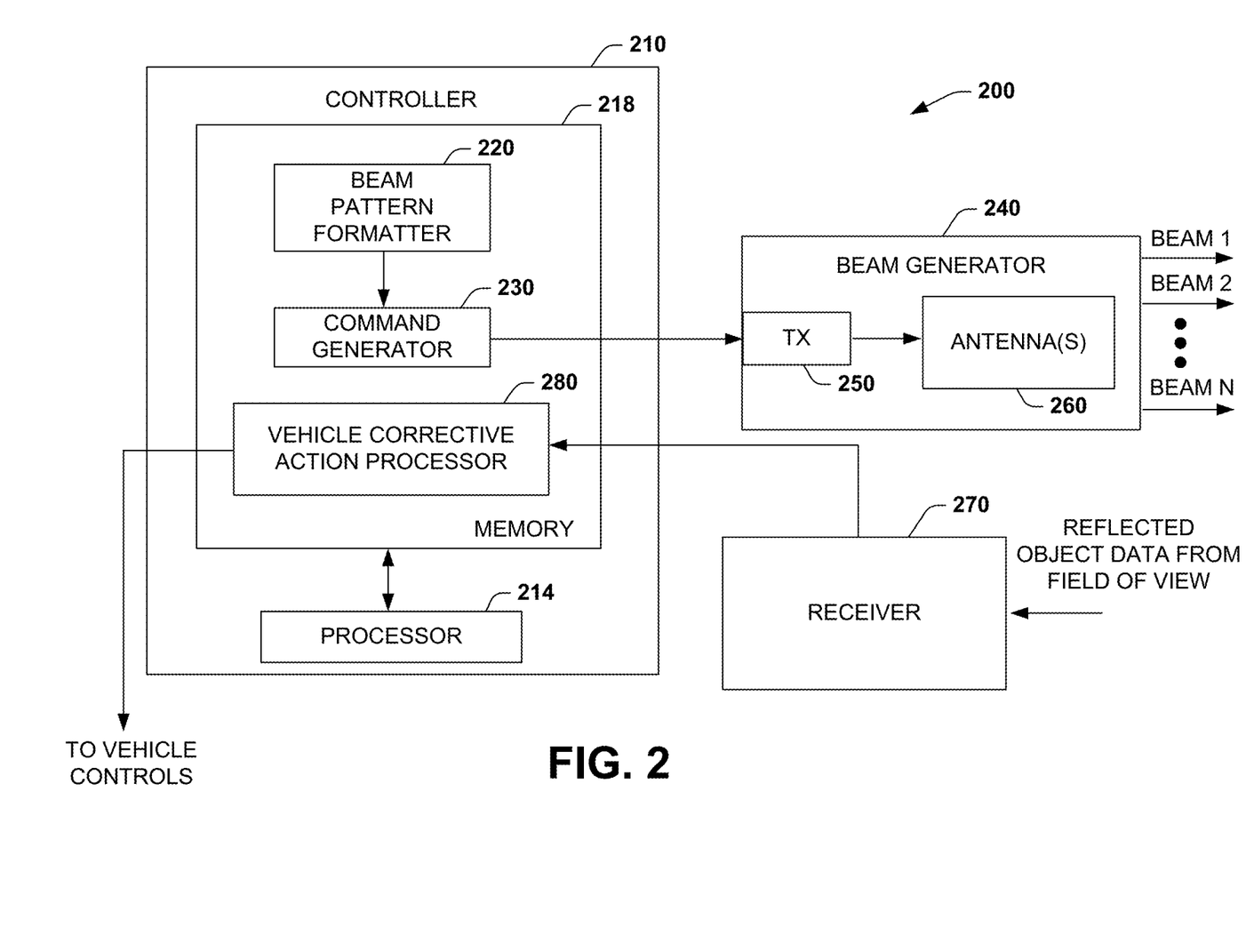
FIG. 2 illustrates an example of a multi-beam transmitter and receiver system to facilitate object detection for a vehicle.
Figure 3:
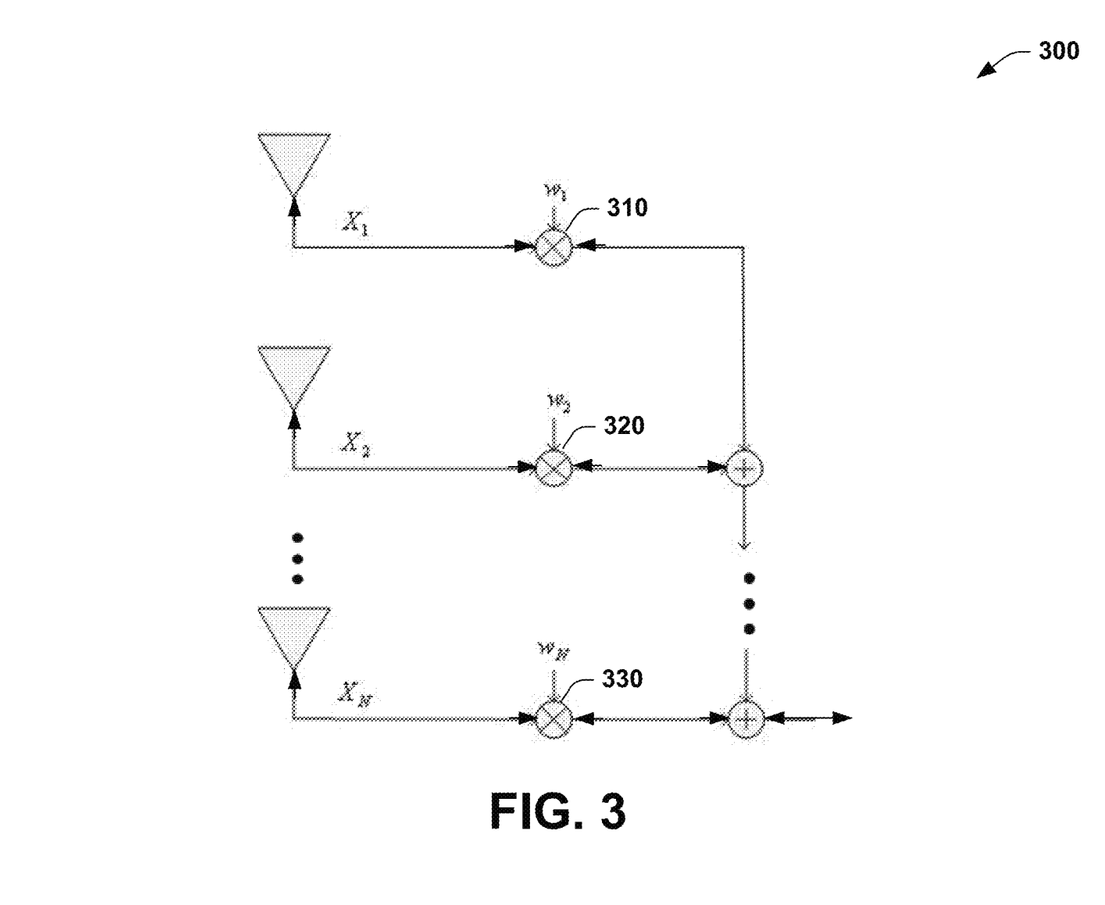
FIG. 3 illustrates an example of a phased antenna array to facilitate object detection for a vehicle.

FIG. 2 illustrates an example of a multi-beam transmitter and receiver system 200 to facilitate object detection for a vehicle. The system 200 includes a controller 210 having a processor 214 and memory 218. Similar to the system described above, the controller 210 can include a beam pattern formatter 220 to provide beam patterns to a command generator 230 to generate beam commands (or command) to a beam generator 240. The beam generator 240 includes a transmitter (or transmitters) (TX) 250 that receives the beam commands and excites one or more antennas 260 based on the beam commands to generate multiple transmit beams shown as Beams 1 though N. As noted above, the antenna 260 can include one or more phased antenna arrays.

At least one receiver 270 can be employed to receive reflected Radio Detection And Ranging (RADAR) signals from objects in the field of regard that are radiated by the Beams 1 though N. The receiver 270 can receive the reflected RADAR signal via a separate receive antenna (not shown) in the receiver or via the phased antenna array 260 of the beam generator. Thus, in one example, beam generation and receiving can consist of a single antenna that can change between transmit and receive mode in a duty cycled fashion (e.g., N % of the time transmit, (100-N) % of the time receive). In another configuration, beam generation and receiving consists of at least two antennas where each antenna is dedicated to either transmit or receive mode (e.g., 100% of the time transmit, 100% of the time receive). For both configurations, the progressive phase weights described herein for transmit and receive modes may be set differently and thus may need to be updated accordingly.

The receiver 270 notifies the controller 210 of detected objects in the field of regard to enable the controller to initiate a vehicle corrective action. The controller 210 includes a vehicle corrective action processor 280 to control at least one vehicle control based on the vehicle corrective action. The vehicle control can include breaks, steering, acceleration controls, cruise control settings, and so forth. The vehicle corrective action processor 280 can initiate various vehicle corrective applications based on the determined vehicle corrective action. This can include initiating an Automated Emergency Braking (AEB) application to stop or slow a vehicle in response to the vehicle corrective action. This can also include initiating an Automated Emergency Steering (AES) application to steer the vehicle in response to the vehicle corrective action. An Adaptive Cruise Control (ACC) application can be supported to adjust a cruising speed for the vehicle in response to the vehicle corrective action. A Collision Warning (CW) application can be provided to warn an operator of the vehicle in response to the vehicle corrective action. A Lane Departure Warning (LDW) application can be supported to warn the operator of a detected lane change for the vehicle in response to the vehicle corrective action. In yet another example, a Lane Keeping Assist (LKA) application can be provided to help the vehicle maintain a given lane in response to the vehicle corrective action from the vehicle corrective action processor 280.

FIG. 3 illustrates an example of a phased antenna array 300 to facilitate object detection for a vehicle. As shown, the phased antenna array includes array elements X1 though XN, with N being a positive integer. Direction arrows show that the elements X1 though XN can be employed as both transmitter elements and receiver elements depending on the selected configuration described herein. Each of the array elements X1-XN can be excited by phased weight summing junctions 310 though 330 which receive phase weight commands w1 though wN. As shown, each succeeding antenna element after X1 receives a progressive phase weight that includes the summed phase weights from the previous element stages. The progressive phase weights are employed to generate constructive and destructive patterns which cause a beam to form in a given direction as described herein.

If a plane wave is incident upon an antenna array, the phase of the signal at the antennas will be a function of the angle of arrival of the plane wave at the receiver. If the signals are then added together, they may add constructively or destructively, depending on the phases. If the signal from each antenna element were multiplied by a complex phase (weights of phased array) that cancelled out the phase change due to the propagation of the wave, then when the signals from each antenna are added together to form the output of the array, and thus they would combine coherently. This is the fundamental principle used in phased arrays—also known as beam steering. With respect to transmitters, progressive phase weight (e.g., mathematically calculate based on the relative position of the element in the array) is applied to each element in the array antenna Beam Forming Network (BFN) to form a plane wave at the face of the antenna aperture that propagate in a desired direction (e.g., beam scanning). To form subsequent beams, parallel BFNs with a different set of progressive phase weights can be implemented, and their output summed at each of the radiating elements. By superposition principle, the system can then concurrently produce multiple beams that radiate in different directions in space. The controllers described herein apply the progressive phase weights to each transmit/receive beam pair so that they are pointing/receiving in the desired direction.

In addition to the other array excitation schemes described herein, digital beam forming techniques may also be applied to the antenna array to generate the separate transmit beams described herein. Thus, an antenna array can be provided where digital beam forming commands are applied to the array to generate the separate beams. As noted above, in beam forming, both the amplitude and phase of each antenna element can be controlled. Combined amplitude and phase control can be used to adjust side lobe levels and steer nulls more suitably than can be achieved by phase control alone. The combined relative amplitude and phase shift for each antenna is called a "complex weight" and is represented by a complex constant wk (for the kth antenna). A beam former for a radio transmitter applies the complex weight to the transmit signal (shifts the phase and sets the amplitude) for each element of the antenna array. In digital beam forming, the operations of phase-shifting and amplitude scaling for each antenna element, and summation for transmitting and/or receiving, are performed digitally. General-purpose digital signal processors (DSP's) (or dedicated beam forming chips) can be used for such processing.

Figure 4:
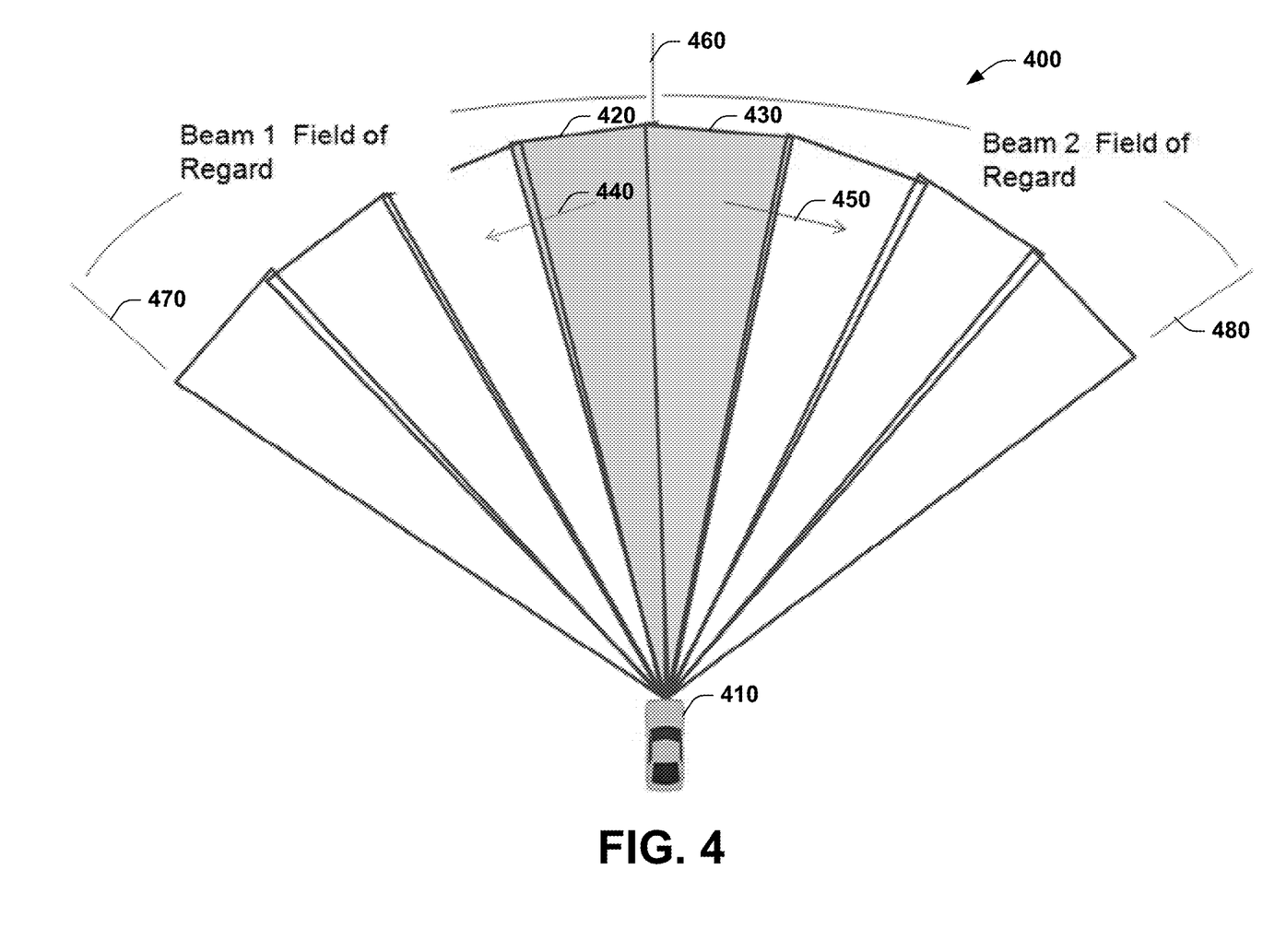
FIG. 4 illustrates an example of a transmitter multi-beam scanning pattern where each beam successively propagates (scans) in different directions across a field of regard.

FIG. 4 illustrates an example of a transmitter multi-beam scanning pattern 400 where each beam propagates in different directions across a field of regard. In this example, a vehicle 400 generates two transmit beams 420 and 430 that start at the positions shown with respect to the front of the vehicle. Scan arrows 440 and 450 show how the respective beams are steered in opposite directions from a centerline 460. Each time a beam is steered to another location according to the directions indicated, a predetermined dwell time is set such that the beams can be positioned in the respective location in order to collect object data from the given location. The transmit beams 420 and 430 are moved along an azimuth direction with respect to the front of the vehicle 410 until reaching a final beam location for each beam shown at 470 and 480, respectively. After dwelling at the end points 460 and 470, the transmit beam patterns can repeat beginning at locations 420 and 430, respectively.

Figure 5:
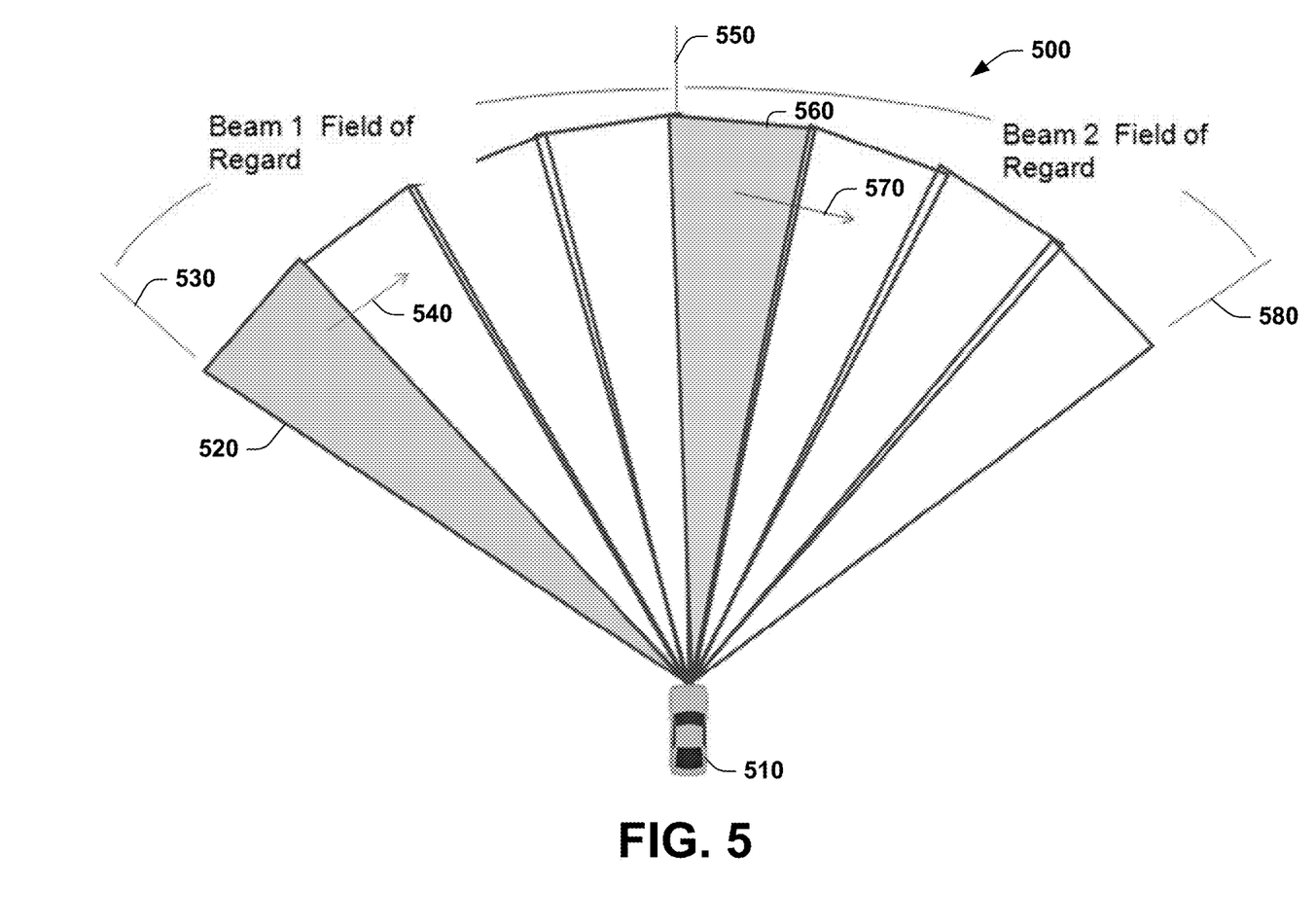
FIG. 5 illustrates an example of a transmitter multi-beam scanning pattern where each beam scans in similar directions across a field of regard.

FIG. 5 illustrates an example of a transmitter multi-beam scanning pattern 500 where each beam propagates in similar directions across a field of regard. In this example, a vehicle 510 having a beam generator generates a beam pattern where a first beam 520 starts at position 530 and is steered in the direction of arrow 540 across several dwell locations until reaching a stopping location 550. A second beam 560 starts at position 550 and is steered in the direction of arrow 570 across several dwell locations until reaching a stopping location 580. After beam the first beam 520 and the second beam 560 reach their respective end locations 550 and 580, respectively, the beam pattern repeats from the beginning 530 and 550, respectively. As can be appreciated, more than two beams can be generated where each beam operates within a smaller field of regard than the examples illustrated herein.

Figure 6:
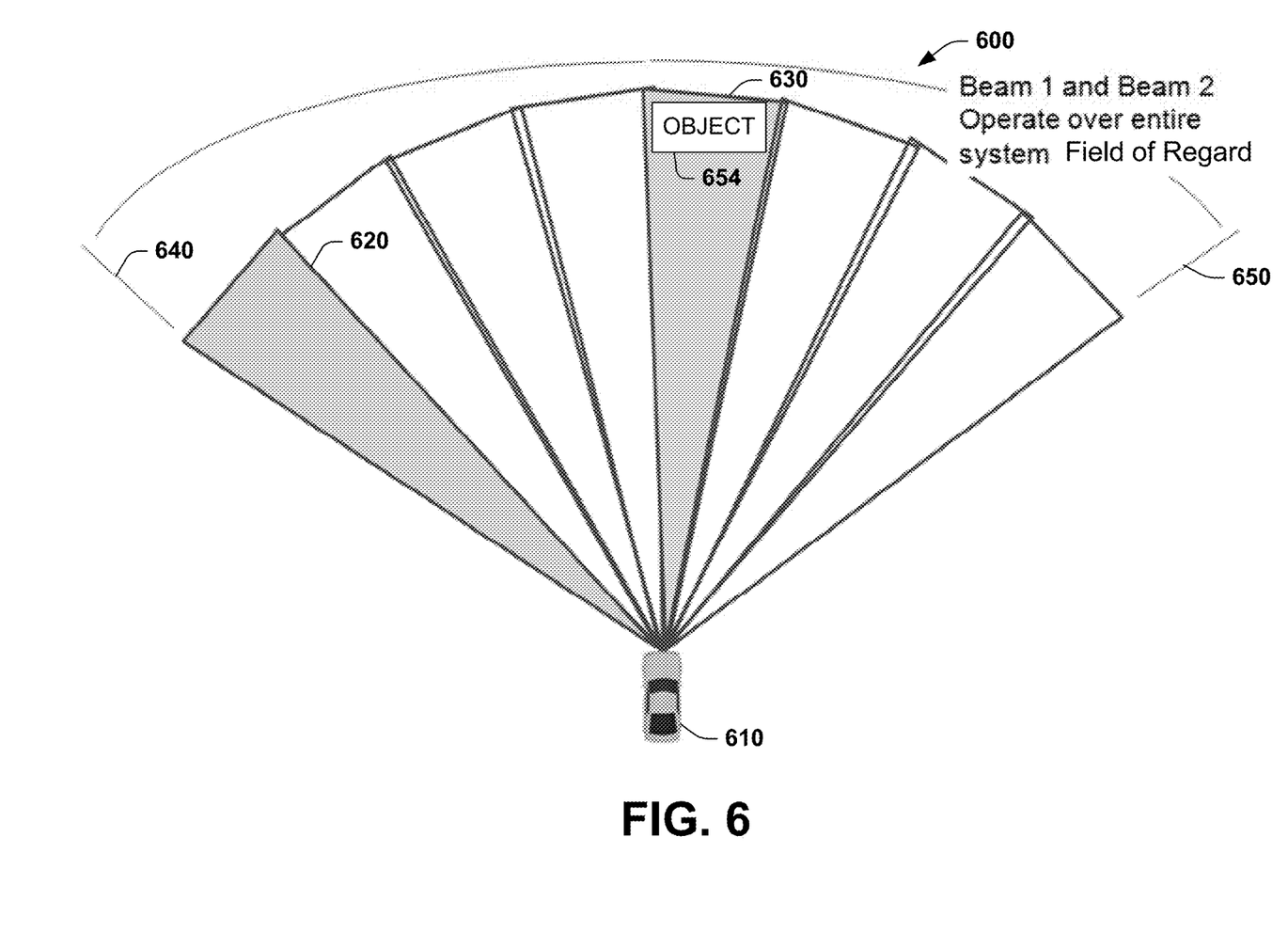
FIG. 6 illustrates an example of a transmitter multi-beam scanning pattern where one beam scans across the entire field of regard and one beam interrogates a specific area within the field of regard where an object has been detected.

FIG. 6 illustrates an example of a transmitter multi-beam scanning pattern 600 where each beam propagates in a wide field of regard and one beam interrogates area within a field where an object has been detected. In this example, vehicle 610 having a beam generator generates a first beam 620 and a second beam 630. Each beam can be separated in space by a predetermined number of dwell locations if desired where each beam scans the entire field of regard beginning at 640 and ending at 650. If an object (e.g., person, car, animal, debris) such as shown at 654 is detected within the field generated by either beam, the beam where the object was detected can be directed to point in the field of the detected object while the other beam can be directed to scan the entire field for other potential objects. In this manner, one beam can be stopped to focus on a detected object (or objects) while the other beam can continue to scan for objects that are outside of the field of the detected object. If more than two beam patterns are employed, two or more fields outside the field of the detected object can continue to scan the entire field while one of the beams remains fixed on the location of the detected object. If a subsequent object is detected, two of the beams can remained fixed on the detected object(s), while the remaining beam (or beams) scan the entire field for other objects.

Figure 7:
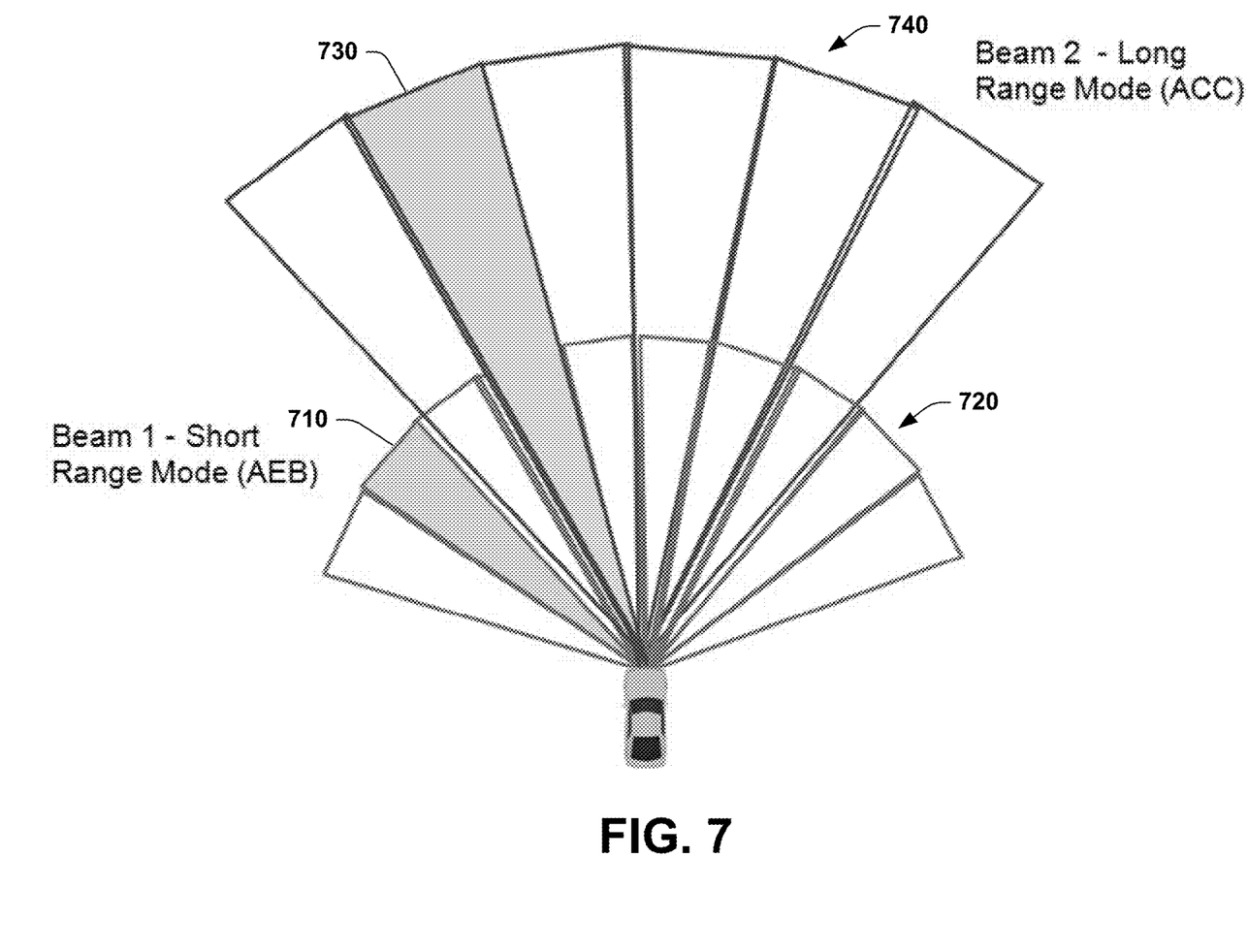
FIG. 7 illustrates an example of a transmitter multi-beam scanning pattern where one beam operates in a short range mode by scanning across a wider field of regard at shorter dwell times and another beam operates in a long range mode by scanning across a narrower field of regard at longer dwell times.

FIG. 7 illustrates an example of a transmitter multi-beam scanning pattern where one beam 710 propagates in a short range field of view shown at 720 and another beam 730 operates in a long range field of view shown at 740. As used herein, the term short range refers to any scanning distance that is less than the distance scanned by the long range field 740. Thus, if the short range field 720 was scanned at a maximum azimuth distance from a vehicle 750 of 100 feet, the long range field 740 would be scanned at a distance greater than 100 feet such as 200 feet for example. By utilizing separate scanning distances, different types of vehicle control applications can be optimized based on the respective distance. For example, in the short range field 720, objects detected in this range can initiate corrective actions for automated emergency breaking (AEB), for example. In the long range field 740, objects detected at this range can initiate an adaptive cruise control (ACC) application, for example.

Figure 8:
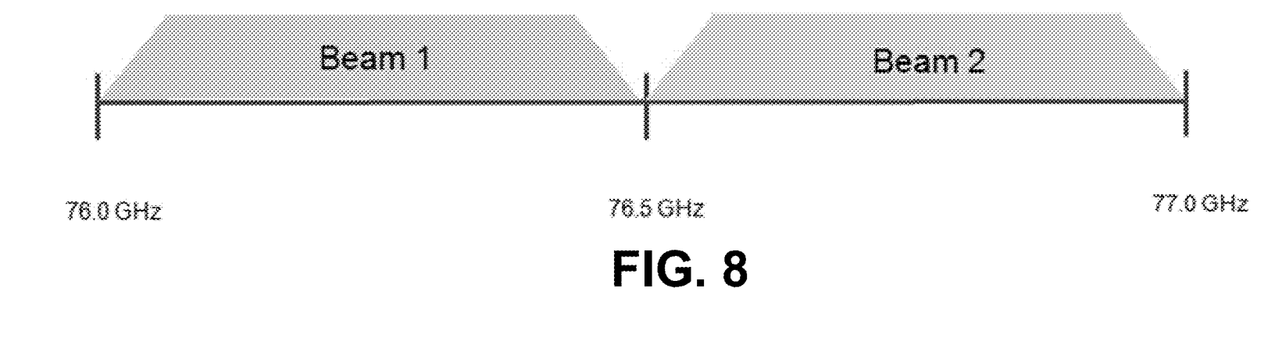
FIG. 8 illustrates an example frequency allocation for a two beam system where each beam propagates with a different scanning frequency range.

FIG. 8 illustrates an example of frequency allocation for a two beam system where each beam propagates with a different scanning frequency range. In this example, two beams are generated shown as beam 1 and beam 2. Beam 1 operates in a frequency range from about 76.0 Ghz to about 76.5 Ghz. Other frequency ranges are possible. In order to provide diversity with respect to Beam 2, Beam 2 can be generated in frequency range from about 76.5 Ghz to about 77 Ghz (or other frequency range. By driving each of the respective beams at different frequencies to provide frequency diversity between beams, information detected from the beams can be received at different frequencies thus avoiding interference and overlap between the beams.

Figure 9:
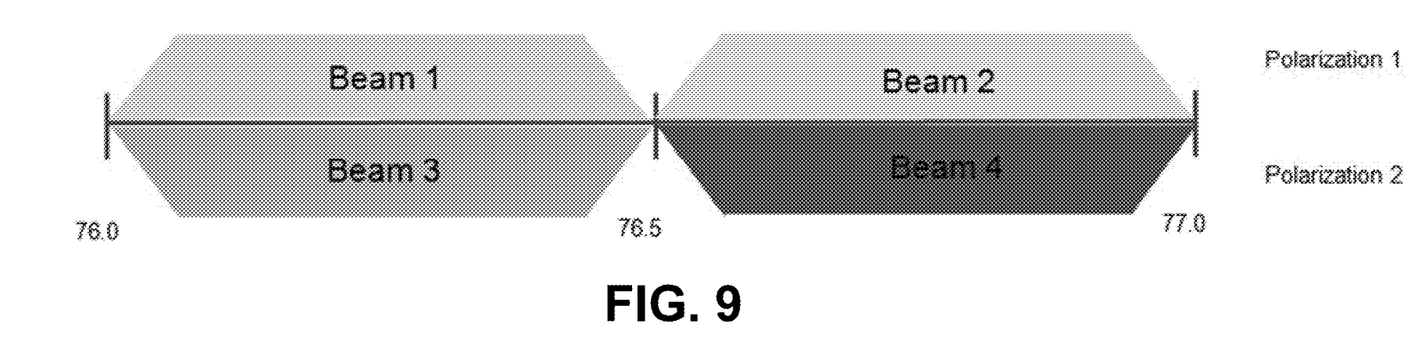
FIG. 9 illustrates an example of frequency allocation for a four-beam system where beams propagate with a different scanning frequency and polarization.

FIG. 9 illustrates an example of a frequency allocation for a four-beam system where beams propagate with a different scanning frequency and polarization. In this example, beams 1, 2, 3, and 4 are generated. Beams 1 and 3 are generated in a first frequency range from about 76.0 Ghz to about 76.5 Ghz and beams 2 and 4 can be generated in a second frequency range from about 76.5 Ghz to about 77 Ghz. To add additional diversity between beams, the respective beams can be generated using differing polarization transmit schemes. For example, Beams 1 and 2 can be generated using electrical field excitation and Beams 3 and 4 can be generated according to a different polarization utilizing magnetic field excitation, for example. The electric field and the magnetic field excitation are transverse with respect to each other and thus, by using differing polarization techniques for excitation, interference between beams can be further mitigated.

Figure 10:
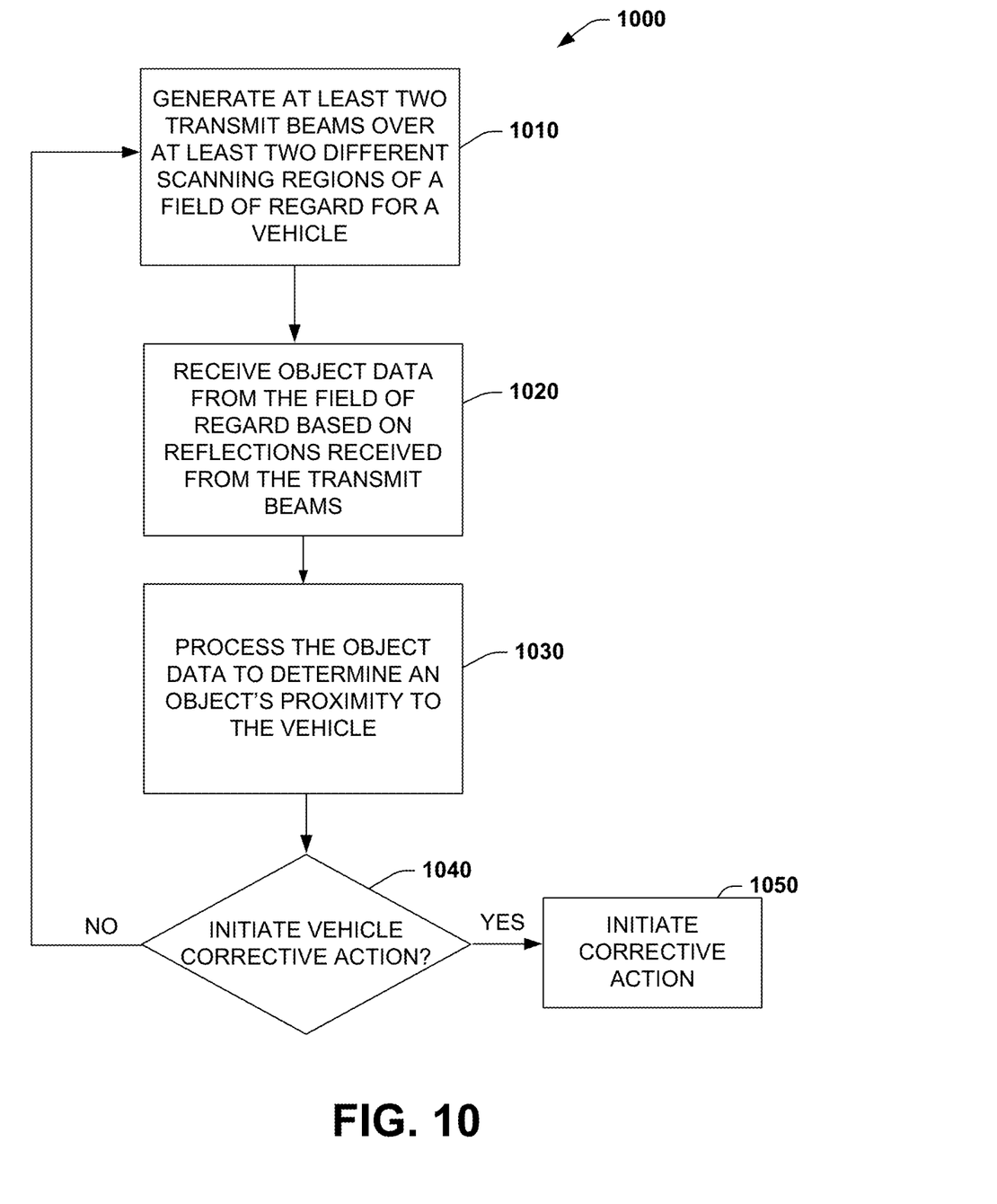
FIG. 10 illustrates an example of a multi-beam transmitter method to facilitate object detection for a vehicle.

In view of the foregoing structural and functional features described above, an example method will be better appreciated with reference to FIG. 10. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 10 illustrates an example of a multi-beam transmitter method 1000 to facilitate object detection for a vehicle. At 1010, the method 100 includes generating at least two transmit beams over at least two different scanning regions of a field of regard for a vehicle in response to a beam command (e.g., via beam generator 240 of FIG. 2). At 1020, the method 1000 includes receiving object data from the field of regard based on reflections received from the at least two transmit beams (e.g., via receiver 270 of FIG. 2). At 1030, the method 1000 includes processing the object data to determine an object's proximity to the vehicle (e.g., via controller 210 of FIG. 2). At 1040, a decision is made as to whether or not to initiate a vehicle corrective action for the vehicle if the object's proximity to the vehicle is determined within a predetermined proximity threshold (e.g., detected object within 100 feet of vehicle). If a detected object is within proximity at 1040, the method 1000 proceeds to initiate corrective at 1050. If no objects are detected at 1040, the method proceeds back to 1010 for subsequent scanning and detection. Although not shown, the method 1000 can also include generating the at least two transmit beams in the same direction in the field of regard or generating the at least two transmit beams in opposite directions in the field of regard based on the beam command.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
a controller comprising a processor and a memory, the processor executes computer-executable instructions stored in the memory to operate the controller, the instructions cause the controller to:
determine at least two beam patterns for separate transmit beams that operate within a field of regard to be scanned by a Radio Detection And Ranging (RADAR) beam generator; and
generate beam pattern commands to the RADAR beam generator to generate the separate transmit beams and steer each of the separate transmit beams simultaneously across different respective subset portions of the field of regard to scan the field of regard for at least one object, the beam pattern commands specify a pointing direction for each of the separate transmit beams that operate across the respective subset portion of the field of regard.

2. The system of claim 1, further comprising a transmitter and at least one antenna to generate the separate transmit beams, the transmitter receives the beam pattern commands and provides excitation to the at least one antenna in response to the beam commands to generate the separate transmit beams.

3. The system of claim 2, wherein the at least one antenna includes at least one phased antenna array to generate the separate transmit beams.

4. The system of claim 3, wherein the at least one phased antenna array utilizes separate antenna arrays to generate the separate transmit beams in response to the beam commands, a single antenna array having antenna sub-arrays within the single antenna array to generate the separate transmit beams in response to the beam commands, a single antenna array that receives progressive phase weight commands as the beam commands that are applied to each element of the single antenna array to generate the separate transmit beams, or utilizes an antenna array where digital beam forming commands are applied to the antenna array to generate the separate transmit beams simultaneously across the different respective subset portions of the field of regard.

5. The system of claim 4, wherein the progressive phase weight commands are applied to each element of the single antenna array to provide a beam forming network (BFN) to form a plane wave at a face of the antenna aperture of the single antenna array to cause a selected beam of the separate transmit beams to radiate in a desired direction.

6. The system of claim 5, wherein a parallel BFN is formed to generate a subsequent beam utilizing a different set of progressive weight commands that are summed at each element of the single antenna array.

7. The system of claim 6, further comprising at least one receiver to receive reflected RADAR signals from the at least one object within the field of regard, the receiver receives the reflected RADAR signal via a separate receive antenna or via the phased antenna array, the receiver notifies the controller of the at least one detected object to enable the controller to initiate a vehicle corrective action.

8. The system of claim 7, further comprising a vehicle corrective action processor to control at least one vehicle control based on the vehicle corrective action, wherein the vehicle corrective action initiates at least one of an Automated Emergency Braking (AEB) application to stop or slow a vehicle in response to the vehicle corrective action, an Automated Emergency Steering (AES) application to steer the vehicle in response to the vehicle corrective action, an Adaptive Cruise Control (ACC) application to adjust a cruising speed for the vehicle in response to the vehicle corrective action, Collision Warning (CW) application to warn an operator of the vehicle in response to the vehicle corrective action, a Lane Departure Warning (LDW) application to warn the operator of a detected lane change for the vehicle in response to the vehicle corrective action, an a Lane Keeping Assist (LKA) application to help the vehicle maintain a given lane in response to the vehicle corrective action.

9. The system of claim 1, wherein if the at least one detected object is detected within a field of view corresponding to a given subset portion of the field of regard scanned by one of the separate transmit beams, the controller initiates a subsequent beam interrogation within the field of view for the at least one detected object.

10. The system of claim 1, wherein the separate transmit beams scan simultaneously in opposite directions across a corresponding subset portion of the field of regard based on the beam commands.

11. The system of claim 1, wherein one beam of the separate transmit beams is generated for a close range field of view with respect to a vehicle and another of the separate transmit beams is generated for a far range field of view that extends a farther transmit distance than the close range field of view based on the beam commands.

12. The system of claim 1, wherein the separate transmit beams are generated at different frequencies based on the beam commands to mitigate interference between the transmit beams.

13. The system of claim 1, wherein the separate transmit beams are generated at different electromagnetic planes that includes an electrical field plane and a magnetic field plane to mitigate interference between the transmit beams.

14. A system, comprising:
a multi-beam generator for a vehicle that transmits at least two transmit beams over at least two different scanning regions of a field of regard in response to a beam command, each of the at least two transmit beams operates at least one of a different radar detection frequency or across a different electromagnetic plane to mitigate interference between the transmit beams, wherein the multi-beam generator is configured to steer concurrently each of the at least two transmit beams across respective scanning regions of the at least two different scanning regions of the field of regard for at least one object; and
a controller for the vehicle to generate the beam command to the multi-beam generator to cause each of the at least two transmit beams to be directed across a respective scanning region of the at least two different scanning regions of the field of regard.

15. The system of claim 14, wherein the multi-beam generator further comprises a transmitter and at least one phased antenna array to generate the at least two transmit beams, the transmitter receives the beam command and provides excitation to the at least one phased antenna array in response to the beam command to generate the at least two transmit beams, the at least two transmit beams are generated as Radio Detection And Ranging (RADAR) beams.

16. The system of claim 15, wherein the at least one phased antenna array utilizes separate antenna arrays to generate the at least two transmit beams in response to the beam command, a single antenna array having antenna sub-arrays within the single antenna array to generate the at least two transmit beams in response to the beam command, or a single antenna array that receives progressive phase weight commands as the beam command that are applied to each element of the single antenna array to generate the at least two transmit beams.

17. The system of claim 14, wherein one beam of the at least two transmit beams is generated for a close range field of view with respect to the vehicle and another beam of the at least two transmit beams is generated for a far range field of view with respect to the vehicle that extends at a farther transmit distance than the close range field of view based on the beam command, wherein the close range field of view is one of the at least two different scanning regions and the far range field of view is another of the at least two different scanning regions.

18. A method, comprising:
generating at least two transmit beams over at least two different scanning regions of a field of regard for a vehicle in response to a beam command;
steering simultaneously each of the at least two transmit beams across respective scanning regions of the at least two different scanning regions of the field of regard for at least one object;
receiving object data from the field of regard based on reflections received from at least one of the at least two transmit beams;
determining a proximity of the at least one object relative to the vehicle based on the object data; and
initiating a vehicle corrective action for the vehicle in response to determining that the proximity of the at least one object relative to the vehicle is within a predetermined proximity threshold.

19. The method of claim 18, further comprising generating the at least two transmit beams in opposite directions across the respective scanning regions of the at least two different scanning regions of the field of regard based on the beam command.

* * * * *